(12) United States Patent
Tucker et al.

(10) Patent No.: US 9,191,407 B2
(45) Date of Patent: Nov. 17, 2015

(54) SECURE CONTROL FOR DESKTOP SECURE VIDEO TELECONFERENCING

(71) Applicants: Richard Warren Tucker, Lancaster, VA (US); Dean A. Woughter, Manassas, VA (US); David M. Tucker, Potomac Falls, VA (US); Donald S. Patz, Leesburg, VA (US); Sergio J. Delhoyo, Leesburg, VA (US)

(72) Inventors: Richard Warren Tucker, Lancaster, VA (US); Dean A. Woughter, Manassas, VA (US); David M. Tucker, Potomac Falls, VA (US); Donald S. Patz, Leesburg, VA (US); Sergio J. Delhoyo, Leesburg, VA (US)

(73) Assignee: FREEPORT TECHNOLOGIES, INC., Herndon, VA (US)

( * ) Notice: Subject to any disclaimer, the term of this patent is extended or adjusted under 35 U.S.C. 154(b) by 371 days.

(21) Appl. No.: 13/942,143

(22) Filed: Jul. 15, 2013

(65) Prior Publication Data

US 2014/0007194 A1    Jan. 2, 2014

Related U.S. Application Data

(60) Division of application No. 13/362,193, filed on Jan. 31, 2012, now Pat. No. 8,548,417, which is a continuation-in-part of application No. 12/538,609, filed on Aug. 10, 2009, now Pat. No. 8,200,792.

(51) Int. Cl.
| | |
|---|---|
| *H04B 1/06* | (2006.01) |
| *H04L 29/06* | (2006.01) |
| *H04M 3/56* | (2006.01) |
| *H04N 7/15* | (2006.01) |
| *H04L 29/08* | (2006.01) |
| *H04M 7/00* | (2006.01) |

(52) U.S. Cl.
CPC ............ *H04L 63/20* (2013.01); *H04L 65/1083* (2013.01); *H04L 65/403* (2013.01); *H04L 67/34* (2013.01); *H04M 3/567* (2013.01); *H04N 7/15* (2013.01); *H04L 63/0823* (2013.01); *H04M 7/0078* (2013.01)

(58) Field of Classification Search
None
See application file for complete search history.

(56) References Cited

U.S. PATENT DOCUMENTS

| | | | |
|---|---|---|---|
| 4,686,698 A | 8/1987 | Tompkins et al. | |
| 6,292,651 B1* | 9/2001 | Dapper | G06F 17/14 455/562.1 |
| 6,564,261 B1 | 5/2003 | Gudjonsson et al. | |
| 6,816,469 B1 | 11/2004 | Kung et al. | |
| 7,412,517 B2* | 8/2008 | Jorgensen | H04L 1/20 455/3.03 |
| 7,529,200 B2 | 5/2009 | Schmidt et al. | |
| 8,194,589 B2 | 6/2012 | Wynn et al. | |
| 8,219,069 B2 | 7/2012 | Yack et al. | |
| 8,331,901 B2 | 12/2012 | Raleigh | |
| 8,416,280 B2* | 4/2013 | Oike | H04L 12/1822 455/552.1 |
| 8,817,971 B2* | 8/2014 | Shida | H05K 7/20336 455/575.1 |

(Continued)

*Primary Examiner* — Lana N Le
(74) *Attorney, Agent, or Firm* — Locke Lord LLP (57) ABSTRACT

Method, system, and computer program product example embodiments of the invention are disclosed to provide multi-network secure video teleconferencing (VTC) for VTC endpoints. The embodiments of the invention include a sequencer that controls the sequence of operations when moving a video teleconferencing terminal between secure networks. The sequencer receives commands to initiate the operation from an initiator, such as a user-initiated button press from a control console or a user-initiated request from an Internet interface, or for a scheduled operation from a scheduling interface. The sequencer then issues commands to a secure database of terminal configuration data and a control isolator to both transfer a video teleconferencing terminal to a new secure network to begin a conference and to remove a video teleconferencing terminal from a secure network to end a conference.

9 Claims, 8 Drawing Sheets

(56) References Cited

U.S. PATENT DOCUMENTS

| | | | |
|---|---|---|---|
| 8,830,892 B2* | 9/2014 | Chung | H04W 52/02 455/574 |
| 9,131,104 B2* | 9/2015 | Nakafuji | H04N 7/141 |
| 2003/0153341 A1 | 8/2003 | Crockett et al. | |
| 2007/0005804 A1 | 1/2007 | Rideout | |
| 2009/0087178 A1 | 4/2009 | Winegard | |
| 2012/0075407 A1 | 3/2012 | Wessling | |
| 2012/0203877 A1 | 8/2012 | Bartholomay et al. | |
| 2012/0224021 A1* | 9/2012 | Begeja | H04N 7/147 348/E7.083 |
| 2012/0229592 A1 | 9/2012 | White | |
| 2012/0274733 A1* | 11/2012 | Yano | H04M 1/02 348/14.08 |
| 2013/0106985 A1 | 5/2013 | Tandon et al. | |
| 2013/0308055 A1* | 11/2013 | Shigemasa | H04N 5/262 348/563 |
| 2014/0267570 A1* | 9/2014 | Weber | H04N 7/148 348/14.08 |
| 2014/0313278 A1* | 10/2014 | Periyannan | H04L 65/403 348/14.08 |
| 2014/0313282 A1* | 10/2014 | Ma | H04N 7/152 348/14.09 |
| 2015/0109401 A1* | 4/2015 | Kasatani | H04N 7/15 348/14.07 |

\* cited by examiner

CONFERENCE START SEQUENCE

SECURE CONTROL FOR DESKTOP SECURE VIDEO TELECONFERENCING

PRIORITY

This is a Divisional application of the co-pending U.S. patent application Ser. No. 13/362,193, filed Jan. 31, 2012, which was a Continuation-In-Part (CIP) of U.S. patent application Ser. No. 12/538,609, filed Aug. 10, 2009, now U.S. Pat. No. 8,200,792. The disclosure of the above-identified prior U.S. patent application, in its entirety, is considered as being part of the present U.S. patent application, and thus, is incorporated herein by reference.

FIELD

The technical field relates to multi-network secure video teleconferencing (VTC) and more particularly relates to providing multi-network secure video teleconferencing for VTC endpoints.

BACKGROUND

Video teleconferencing (VTC) networks typically interconnect VTC end points, which can range from a limited bandwidth desktop PC connected through the Internet, to elaborate videoconference rooms designed for high quality-of-service communication and equipped with high definition displays requiring a high bandwidth. The networks can range from packet switched Internet links to dedicated, circuit switched trunks that may include international links through undersea fiber optical cables. The protocol used for VTC transmission across circuit switched networks is the H.320 suite of protocols promulgated by the ITU-T for running Multimedia (Audio/Video/Data) over ISDN based networks, which is incorporated herein by reference. The protocols that are commonly used for VTC transmission across IP based networks are the H.323 suite of protocols promulgated by the ITU Telecommunication Standardization Sector (ITU-T) to provide audio-visual communication sessions on any packet network and the SIP protocol that is an Internet Engineering Task Force (IETF) protocol which provides signaling control for voice and video communication sessions, which are incorporated herein by reference.

Where physical and operational security is required for video teleconferencing, the entire VTC system must be configured to support the requisite security. The primary security issue with VTC endpoints is confidentiality, which relates, not only to the confidentiality of VTC traffic on the network, but also to the confidentiality of the collateral information in the room in which the VTC endpoint is placed. In addition, access control needs to be secure to avoid a VTC endpoint being compromised and remotely controlled over an IP network. Because these vulnerabilities are more prevalent in Ethernet/IP based VTC endpoint implementations, extra consideration must be given to the network architecture supporting the VTC endpoint as well as the configuration of the device itself.

Centralized multi-network secure video teleconferencing switching systems provide VTC access to multiple networks using a single VTC system. The U.S. Department of Defense security requirements for such systems have been defined by the Defense Information Security Administration (DISA) in the *Video Tele-Conference Security Technical Implementation Guide*, Version 1, Release 1, Jan. 8, 2008, which is incorporated herein by reference.

Centralized multi-network secure video teleconferencing security systems are currently being deployed in racks along with the audio-visual (AV) equipment required in AV room systems.

What is needed is a Multi-Domain Video Network Switch system with secure control that meets DISA and other standard security requirements, but in a manner that minimizes cabling to and from VTC endpoints and enhances operation, management and control across multiple networks.

SUMMARY

Method, system, and computer program product example embodiments of the invention are disclosed to provide Multi-Domain Video Network Switch system. Example embodiments of the invention include a sequencer that controls the sequence of operations when moving a video teleconferencing terminal between secure networks. The sequencer receives commands to initiate the operation from an initiator, such as a user-initiated button press from a control console or a user-initiated request from an Internet interface, or for a scheduled operation from a scheduling interface. The sequencer then issues commands to a secure database of terminal configuration data and a control isolator to both transfer a video teleconferencing terminal to a new secure network to begin a conference and to remove a video teleconferencing terminal from a secure network to end a conference.

An example embodiment of the invention includes a method to begin a conference, comprising:

receiving in a sequencer, a message from an initiator identifying a video teleconferencing terminal needs to be placed on a new secure network to begin a conference;

sending by the sequencer, a command to a control isolator to signal a secure network switch to switch the video teleconferencing terminal to the new secure network;

sending by the sequencer, a command to a control isolator to power on a media converter connecting the secure network switch to the video teleconferencing terminal, to enable the video teleconferencing terminal to come online on the new secure network and be assigned a network address;

sending by the sequencer, a message to a secure database of terminal configuration data for the new secure network, announcing that the video teleconferencing terminal is coming online, to enable verification of the video teleconferencing terminal's identity, enable uploading configuration data to the video teleconferencing terminal for the new network, and enable rebooting of the video teleconferencing terminal;

receiving in the sequencer, a message from the secure database of terminal configuration data, announcing that the video teleconferencing terminal has been configured; and sending by the sequencer, a message to the initiator announcing that the video teleconferencing terminal is ready for conference.

An example embodiment of the invention includes the method further comprising:

initiating placing the video teleconferencing terminal on the new secure network by pressing a button on a control console, initiating placing the video teleconferencing terminal on the new secure network by a signal from a room control system, or initiating placing the video teleconferencing terminal on the new secure network by a web interface to the sequencer.

An example embodiment of the invention includes the method further comprising:

verifying that the secure network switch has switched the video teleconferencing terminal to the new secure network.

An example embodiment of the invention includes the method further comprising:

sending by the sequencer, a command to the control isolator to display a message at or near a display device of the video teleconferencing terminal indicating that a classification is being changed; and sending by the sequencer, a command to the control isolator to power on the video teleconferencing terminal.

Example embodiments of the invention include a method to end a conference, comprising:

receiving in a sequencer, a message from an initiator identifying a video teleconferencing terminal needs to be removed from a secure network to end a conference;

if terminal configuration capture is enabled for the secure network, then sending by the sequencer, a message to a secure database of terminal configuration data, announcing that the video teleconferencing terminal will be taken offline, to enable making a backup copy of information in non-volatile memory of the video teleconferencing terminal;

sending by the sequencer, a command to a control isolator to power off a media converter connecting a secure network switch to the video teleconferencing terminal, to enable removing the video teleconferencing terminal from the secure network;

sending by the sequencer, a command to the video teleconferencing terminal, via the control isolator, to delete any information in non-volatile memory, thereby setting the video teleconferencing terminal back to a factory default state; and sending by the sequencer, a command to the control isolator, to remove power from the video teleconferencing terminal, thereby removing any data in volatile memory.

An example embodiment of the invention includes the method further comprising:

causing resetting a codec in the video teleconferencing terminal back to a factory default state, and verifying that data cleaning of the codec was successful after the resetting.

An example embodiment of the invention includes the method further comprising:

sending by the sequencer, a command to the control isolator to display a message on a display device at or near the video teleconferencing terminal indicating that a classification is being changed.

Example embodiments of the invention include an apparatus to begin a conference, comprising:

at least one processor;

at least one memory including computer program code;

the at least one memory and the computer program code configured to, with the at least one processor, cause the apparatus at least to:

receive in the apparatus, a message from an initiator identifying a video teleconferencing terminal needs to be placed on a new secure network to begin a conference;

send by the apparatus, a command to a control isolator to signal a secure network switch to switch the video teleconferencing terminal to the new secure network;

send by the apparatus, a command to a control isolator to power on a media converter connecting the secure network switch to the video teleconferencing terminal, to enable the video teleconferencing terminal to come online on the new secure network and be assigned a network address;

send by the apparatus, a message to a secure database of terminal configuration data for the new secure network, announcing that the video teleconferencing terminal is coming online, to enable verification of the video teleconferencing terminal's identity, enable uploading configuration data to the video teleconferencing terminal for the new network, and enable rebooting of the video teleconferencing terminal;

receive in the apparatus, a message from the secure database of terminal configuration data, announcing that the video teleconferencing terminal has been configured; and send by the apparatus, a message to the initiator announcing that the video teleconferencing terminal is ready for conference.

An example embodiment of the invention includes the apparatus further comprising:

the at least one memory and the computer program code configured to, with the at least one processor, cause the apparatus at least to:

initiate placing the video teleconferencing terminal on the new secure network by pressing a button on a control console, initiate placing the video teleconferencing terminal on the new secure network by a signal from a room control system, or initiate placing the video teleconferencing terminal on the new secure network by a web interface to the sequencer.

An example embodiment of the invention includes the apparatus further comprising:

the at least one memory and the computer program code configured to, with the at least one processor, cause the apparatus at least to:

verify that the secure network switch has switched the video teleconferencing terminal to the new secure network.

An example embodiment of the invention includes the apparatus further comprising:

the at least one memory and the computer program code configured to, with the at least one processor, cause the apparatus at least to:

send by the sequencer, a command to the control isolator to display a message at or near a display device of the video teleconferencing terminal indicating that a classification is being changed; and send by the sequencer, a command to the control isolator to power on the video teleconferencing terminal.

Example embodiments of the invention include an apparatus to end a conference, comprising:

at least one processor;

at least one memory including computer program code;

the at least one memory and the computer program code configured to, with the at least one processor, cause the apparatus at least to:

receive in a apparatus, a message from an initiator identifying a video teleconferencing terminal needs to be removed from a secure network to end a conference;

if terminal configuration capture is enabled for the secure network, then send by the apparatus, a message to a secure database of terminal configuration data, announcing that the video teleconferencing terminal will be taken offline, to enable making a backup copy of information in non-volatile memory of the video teleconferencing terminal;

send by the apparatus, a command to a control isolator to power off a media converter connecting a secure network switch to the video teleconferencing terminal, to enable removing the video teleconferencing terminal from the secure network;

send by the apparatus, a command to the video teleconferencing terminal, via the control isolator, to delete any information in non-volatile memory, thereby setting the video teleconferencing terminal back to a factory default state; and send by the apparatus, a command to the control isolator, to remove power from the video teleconferencing terminal, thereby removing any data in volatile memory.

An example embodiment of the invention includes the apparatus further comprising:

the at least one memory and the computer program code configured to, with the at least one processor, cause the apparatus at least to:

cause resetting a codec in the video teleconferencing terminal back to a factory default state, and verify that data cleaning of the codec was successful after the resetting.

An example embodiment of the invention includes the apparatus further comprising:

the at least one memory and the computer program code configured to, with the at least one processor, cause the apparatus at least to:

send by the sequencer, a command to the control isolator to display a message on a display device at or near the video teleconferencing terminal indicating that a classification is being changed.

Example embodiments of the invention include a computer program product to begin a conference, the computer program product comprising computer executable program code recorded on a computer readable non-transitory storage medium, the computer executable program code, when executed by a computer processor, causing performance of the steps of:

receiving in a sequencer, a message from an initiator identifying a video teleconferencing terminal needs to be placed on a new secure network to begin a conference;

sending by the sequencer, a command to a control isolator to signal a secure network switch to switch the video teleconferencing terminal to the new secure network;

sending by the sequencer, a command to a control isolator to power on a media converter connecting the secure network switch to the video teleconferencing terminal, to enable the video teleconferencing terminal to come online on the new secure network and be assigned a network address;

sending by the sequencer, a message to a secure database of terminal configuration data for the new secure network, announcing that the video teleconferencing terminal is coming online, to enable verification of the video teleconferencing terminal's identity, enable uploading configuration data to the video teleconferencing terminal for the new network, and enable rebooting of the video teleconferencing terminal;

receiving in the sequencer, a message from the secure database of terminal configuration data, announcing that the video teleconferencing terminal has been configured; and sending by the sequencer, a message to the initiator announcing that the video teleconferencing terminal is ready for conference.

Example embodiments of the invention include the computer program product further comprising computer executable program code recorded on a computer readable non-transitory storage medium, the computer executable program code, when executed by a computer processor, causing performance of the step of:

initiating placing the video teleconferencing terminal on the new secure network by pressing a button on a control console, initiating placing the video teleconferencing terminal on the new secure network by a signal from a room control system, or initiating placing the video teleconferencing terminal on the new secure network by a web interface to the sequencer.

Example embodiments of the invention include the computer program product further comprising computer executable program code recorded on a computer readable non-transitory storage medium, the computer executable program code, when executed by a computer processor, causing performance of the step of:

verifying that the secure network switch has switched the video teleconferencing terminal to the new secure network.

Example embodiments of the invention include the computer program product further comprising computer executable program code recorded on a computer readable non-transitory storage medium, the computer executable program code, when executed by a computer processor, causing performance of the step of:

sending by the sequencer, a command to the control isolator to display a message at or near a display device of the video teleconferencing terminal indicating that a classification is being changed; and sending by the sequencer, a command to the control isolator to power on the video teleconferencing terminal.

Example embodiments of the invention include a computer program product to end a conference, the computer program product comprising computer executable program code recorded on a computer readable non-transitory storage medium, the computer executable program code, when executed by a computer processor, causing performance of the steps of:

receiving in a sequencer, a message from an initiator identifying a video teleconferencing terminal needs to be removed from a secure network to end a conference;

if terminal configuration capture is enabled for the secure network, then sending by the sequencer, a message to a secure database of terminal configuration data, announcing that the video teleconferencing terminal will be taken offline, to enable making a backup copy of information in non-volatile memory of the video teleconferencing terminal;

sending by the sequencer, a command to a control isolator to power off a media converter connecting a secure network switch to the video teleconferencing terminal, to enable removing the video teleconferencing terminal from the secure network;

sending by the sequencer, a command to the video teleconferencing terminal, via the control isolator, to delete any information in non-volatile memory, thereby setting the video teleconferencing terminal back to a factory default state; and sending by the sequencer, a command to the control isolator, to remove power from the video teleconferencing terminal, thereby removing any data in volatile memory.

Example embodiments of the invention include the computer program product further comprising computer executable program code recorded on a computer readable non-transitory storage medium, the computer executable program code, when executed by a computer processor, causing performance of the step of:

causing resetting a codec in the video teleconferencing terminal back to a factory default state, and verifying that data cleaning of the codec was successful after the resetting.

Example embodiments of the invention include the computer program product further comprising computer executable program code recorded on a computer readable non-transitory storage medium, the computer executable program code, when executed by a computer processor, causing performance of the step of:

sending by the sequencer, a command to the control isolator to display a message on a display device at or near the video teleconferencing terminal indicating that a classification is being changed.

The resulting embodiments of the invention provide a Multi-Domain Video Network Switch system that meets the DISA and other standard security requirements.

DESCRIPTION OF THE FIGURES

Example embodiments of the invention are shown in the accompanying figures.

DISCUSSION OF EXAMPLE EMBODIMENTS OF THE INVENTION

Figure 1A:
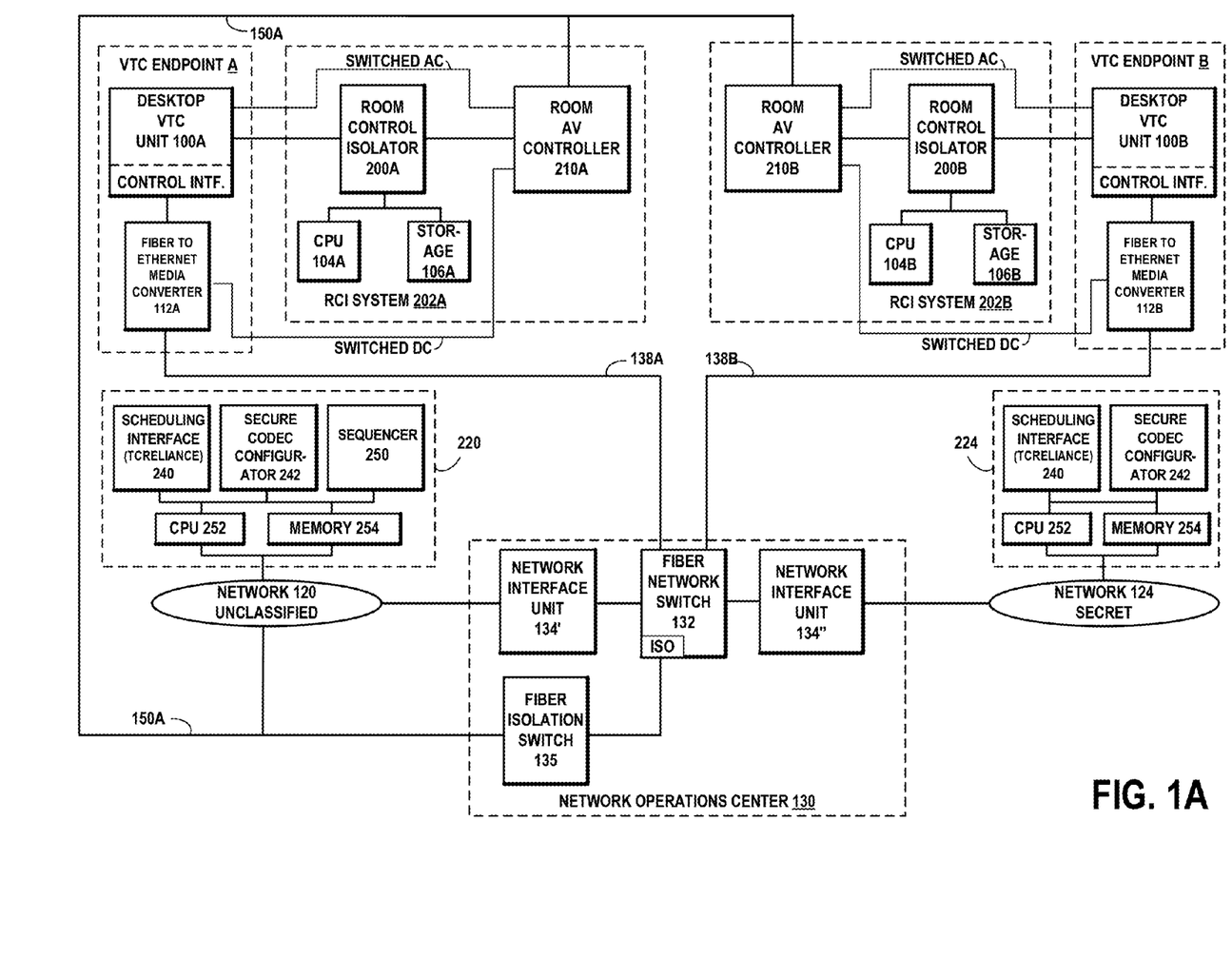
FIG. 1A is an example network diagram showing an embodiment the Multi-Domain Video Network Switch system.

FIG. 1A is an example network diagram showing the Multi-Domain Video Network Switch system. The embodiments of the invention provide distributed components to perform the necessary operations, rather than co-locating the components in the VTC endpoint. Some system components are located with the VTC endpoint A and B, other components are placed in a network operations center (NOC) 130 and still other components are distributed on the various networks 120 and 124.

The desktop multi-network secure switching components include components required for each desktop VTC endpoint A and B, components required for the network operations center (NOC) 130 or video operations center (VOC), and components required for each network 120 and 124.

Components for each of the desktop VTC endpoints A and B, each located at a desktop, include a desktop VTC unit 100A and 100B, which may be for example, a Codec with an integrated video camera, an LCD display, a microphone and a speaker. The VTC endpoints A and B may be any device implementing H.323 or SIP and capable of being data-cleaned. Also included at each VTC endpoint A and B is a fiber to Ethernet media converter 112A and 112B, which may be a Fiber to CAT5/6 Ethernet Media Converter. These converters may be powered through the room control isolation (RCI) system 202 to provide additional security. Optionally, each VTC endpoint A and B may include a local control system (LCS) that includes a plurality of network selection buttons to enable the desktop user to select which one of a corresponding plurality of networks 120 or 124 on which to he or she is interested in conferencing.

A teleconferencing room audio/visual (A/V) controllers 210A and 210B may be configured control a plasma displays, speakers, and amplifiers, to present uncompressed video and audio streams decoded by a codec in or associated with the desktop VTC unit 100A and 100B, as received by the codec in compressed form from the fiber network switch 132. The teleconferencing room audio/visual (A/V) controllers 210A and 210B may also be configured control cameras and microphones to capture video and audio signals in the meeting room and input them as audio-visual streams to the codec in or associated with the desktop VTC unit 100A and 100B for compression and transmission via the fiber network switch 132. The teleconferencing room controllers 210A and 210B receive room control commands from buttons and/or from a room control console to control the codec in or associated with the video conferencing room, such as for sending a camera image, to display the meeting room (near side) and the remote VTC system (far side), and for dialing a call.

The desktop VTC unit 100A may be selectively connected to classified and unclassified traffic networks, such as unclassified telecommunication network 120 and secret telecommunications network 124 by means of the fiber network switch 132 in a network operations center. The teleconferencing networks 120 and 124 may be Internet, ISDN, or other telecommunication networks enabling secure and unsecure video teleconferencing sessions with remote video teleconferencing endpoints.

The Room Controller Isolator System (RCI System) 202A associated with the desktop VTC unit 100A of FIG. 1A, includes the room AV controller 210A and the room control isolator 200A, with its CPU 104A and storage 106A. Similarly, Room Controller Isolator System (RCI System) 202B associated with the desktop VTC unit 100B of FIG. 1A, includes the room AV controller 210B and the room control isolator 200B, with its CPU 104A and storage 106A.

The room control isolator 200A shown in FIGS. 1A, 1B, 2 and 3 provides one-way isolation of signals to the VTC terminal 100A from the room AV controller 210A. The room control isolator 200B provides one-way isolation of signals to the VTC terminal 100B from the room AV controller 210B. The fiber network switch (FNS) 132 may be an all-fiber-based switch used to securely switch a desktop VTC unit 100A, for example, to different networks 120 or 124 and provide separation between different network connections to prevent crosstalk, or bleed-over, from one connector to the other. The fiber network switch (FNS) 132 may also include a secure isolated control port, ISO, that maintains a secure separation between switch control signals and the optical fiber switches connecting the secure networks 120 and 124.

Figure 1B:
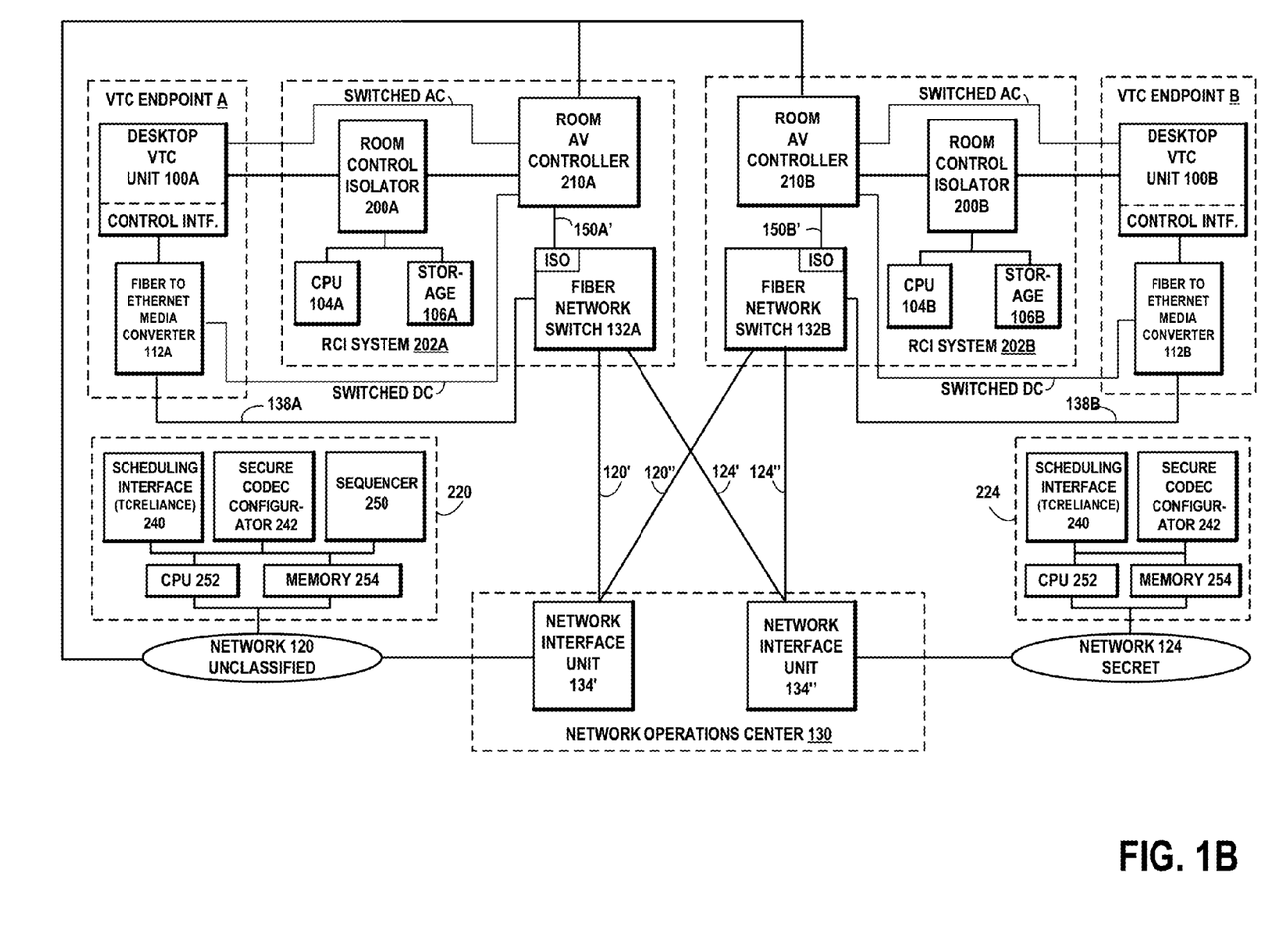
FIG. 1B is an example network diagram showing still another embodiment the Multi-Domain Video Network Switch system.

The primary purpose of the room control isolators 200A and 200B is to prevent classified data from being transferred from the VTC terminals 100A and 100B and their associated networks 120 and 124 to the AV controllers 210A or 210B through their serial port connections. This is critical because the room AV controller 210A or 210B may be connected to the Enterprise's Unclassified network. The communications link between the AV controller 210A or 210B and the Codecs in or associated with the VTC terminals 100A and 100B must be constructed in a manner that the AV controller 210A or 210B does not have access to sensitive Codec data or to data on the Enterprise Secret network 120 and Enterprise Secret network 124 when the Codec is connected to those networks. The RCI System 202A and 202B provide this capability through a serial data diode operation of the room control isolators 200A and 200B that allows serial communications to take place only from the AV controller 210A or 210B to the Codec in or associated with the desktop VTC unit 100A and 100B. Commands are sent to the VTC terminal 100A and 100B through an optically isolated path. Results of the commands are evaluated by the RCI 202A or 202B and success/fail is returned through relays, so that there is no serial data path back. In addition, the RCI System 202A and 202B allows for relay control of the fiber switch 132 at its ISO control port over line 150A, enabling remote control and evaluation of the switches from a central point on the network. Power switching for the VTC terminal 100A and 100B and media converter 112A and 112B is also part of the RCI System 202A and 202B. Each of the room control isolators 200A and 200B is coupled to a respective CPU 104A and 104B and storage 106A and 106B. The storage 106A and 106B store computer programs that run on the respective CPU 104A and 104B to carry out the functions of the room control isolators.

The fiber to Ethernet media converter 112A or 112B enables electrical signals from the VTC unit 100A or 100B to be converted into fiber optical signals for transmission on respective links 138A or 138B to the fiber network switch 132.

Components at each network operations center (NOC) 130 or video operations center (VOC) include a fiber network switch (FNS) 132 with ISO control port, a Network Interface Unit 134' and 134" for each respective supported network 120 and 124, respectively. The NOC 130 is connected by an Ethernet link 150A to the room AV controllers 210A and 210B through a fiber isolation switch 135 that provides a high level of selectively switched isolation between the room AV controllers 210A and 210B and the fiber network switch (FNS) 132.

The fiber network switch (FNS) 132 may be an all-fiber-based switch used to securely switch a desktop VTC unit 100A, for example, to different networks 120 or 124 and provide separation between different network connections to prevent crosstalk, or bleed-over, from one connector to the other. The fiber network switch (FNS) 132 may also include a secure isolated control port, ISO, that maintains a secure separation between switch control signals and the optical fiber switches connecting the secure networks 120 and 124.

FIG. 1B is an example network diagram showing still another embodiment of the Multi-Domain Video Network Switch system, wherein the fiber network switch (FNS) 132A is part of the RCI system 202A. The room AV controller 210A inputs its switch control signals 150A' to the fiber network switch (FNS) 132A at the secure isolated control port, ISO, that maintains a secure separation between switch control signals 150A' and the optical fiber switches connecting the secure networks 120 and 124. Similarly, fiber network switch (FNS) 132B is part of the RCI system 202B. The room AV controller 210B inputs its switch control signals 150B' to the fiber network switch (FNS) 132B at the secure isolated control port, ISO, that maintains a secure separation between switch control signals 150B' and the optical fiber switches connecting the secure networks 120 and 124. Optionally, the room controllers 210A and 210B may use the unclassified network 120 to pass control signals through the network operations center 130 to the unclassified side of the fiber switches 132A and 132B.

FIGS. 1A and 1B illustrates that each network 120 and 124 includes a network server node 220 and 224, respectively. The network server node 220 includes a CPU 252 and memory 254. The memory stores computer programs that run on the CPU for a scheduling interface 240, a secure Codec configurator 242, and a sequencer 250. The scheduling interface 240 is also referred to herein as TC Reliance™. The network server node 224 also includes a CPU 252 and memory 254 and computer programs that run on the CPU for a scheduling interface 240 and a secure Codec configurator 242.

The scheduling interface 240 or TC Reliance™ is the scheduling interface that will make the decisions about what network a VTC terminal should be connected to. When a room is scheduled for a call on a given network; TC Reliance 240 will send a command to the sequencer 250 (also referred to herein as E-Sequencer) to start the switching sequence, which will in turn prepare the VTC terminal for the conference.

The Sequencer 250 (E-Sequencer) is software that runs alongside the scheduling interface 240 (TC Reliance). Its purpose is to control the sequence of operations when moving a VTC terminal between networks. It receives commands from scheduling interface 240 (TC Reliance), and issues commands to the Secure codec Configurator 242 (E-SCC) and RCI System 202A or 202B.

The Secure codec Configurator 242 (E-SCC) is software that interfaces with most of the VTC terminals. It is responsible for maintaining a list of VTC terminals on the network, as well as a database of configuration data for each of those terminals. When a VTC terminal is being switched on to a network, it is the E-SCC 242 that will connect the terminal to load settings data. When a VTC terminal is leaving a network, the E-SCC 242 can connect and access an up-to-date copy of the terminal's settings. The E-SCC 242 maintains the backup, storage, and restoration of VTC terminal profiles.

The Fiber Optic Switch 132A and 132B is an approved device for network switching. It is relay controlled and provides confirmation of a successful network switch operation.

The media converter 112A and 112B converts the fiber coming from the fiber switch 132, to copper that the VTC terminal requires.

Figure 2:
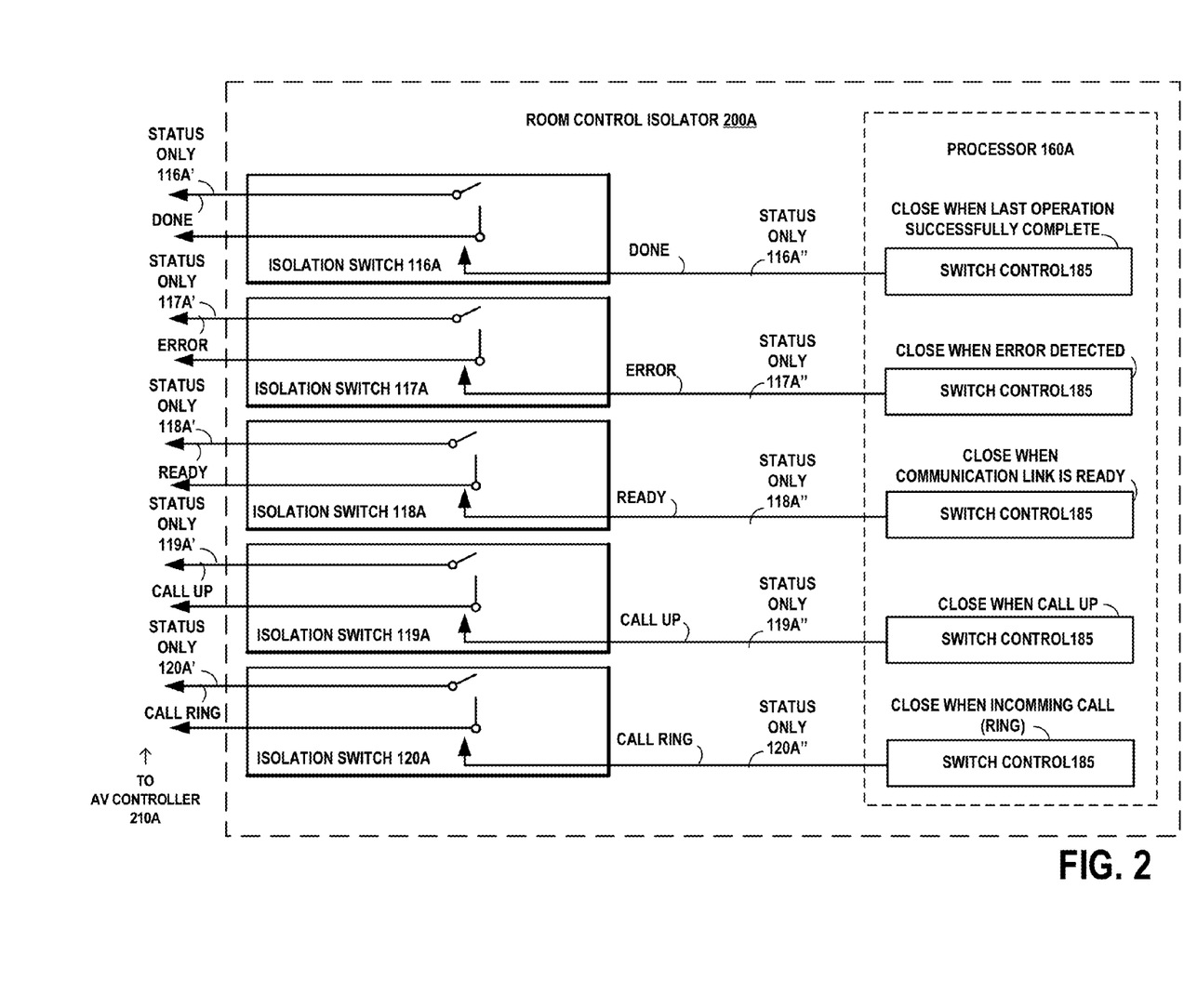
FIG. 2 is a more detailed example network diagram showing the secure room control isolator.
Figure 3:
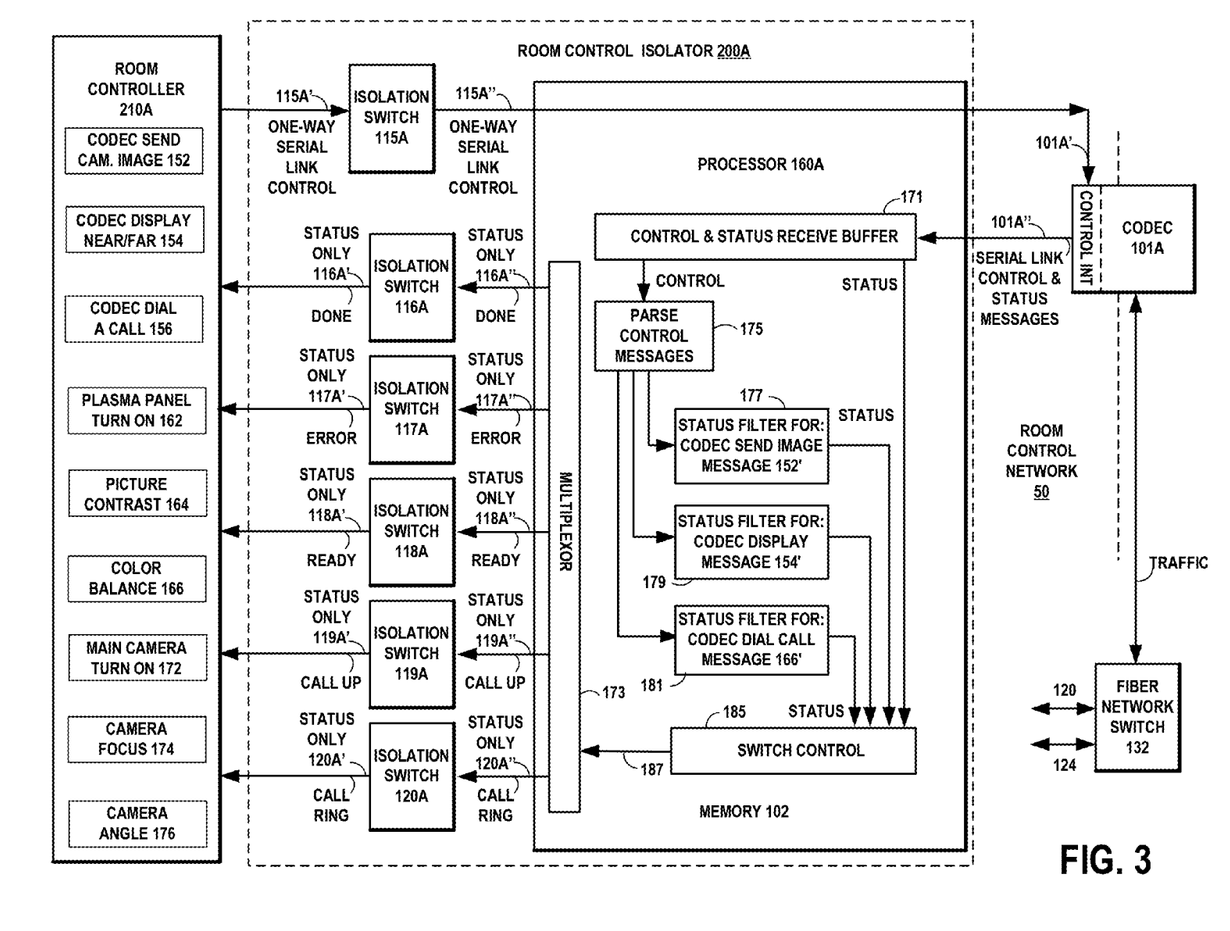
FIG. 3 is a another detailed example network diagram showing the secure room control isolator.

FIGS. 2 and 3 illustrate an example network diagram showing the secure room control isolator 200 of the RCI system 202. The Room Controller Isolator 200 prevents classified data from being transferred from the VTC terminals 100A and 100B and their associated networks to the AV controllers 210A and 210B through serial port connections.

The purpose of the room control isolator 200A, for example, is to prevent the room controller 210A from accessing sensitive information in the codec 101A of the VTC terminal 100A, to prevent an interloper from gaining unauthorized access to sensitive or classified information that may be present in the codec. The room controller isolators 200A and 200B meet the DISA and other standard security requirements and enhance operation, management and control of the video teleconferencing room.

In an example embodiment of the invention, the room control isolator 200A of FIGS. 2 and 3 is coupled between the video teleconferencing room controller 210A and the codec 101A, to enable control commands 152, 154, and 156 to be sent from the room controller 210A over a one way serial link 115A'-115A" established by the isolation switch 115A to the codec 101A. The isolation switch 115A uses optical fiber, relays or other air gap isolation techniques, to provide a high level of one way isolation between the room controller 210A and the codec 101A. Any backward-directed flow of signals from the codec 101A to the room controller 210A is prevented through the isolation switch 115A. This eliminates the ability of the room controller 210A to access any network or conference information from the codec through the isolation switch 115A.

A processor 160A (associated with the CPU 104A of FIGS. 1A and 1B) is connected to the serial link isolation switch 115A to examine the serial commands and pass only legitimate commands over serial link 101A' to the control interface of the codec 101A. Commands are blocked by the processor 160A, which would request the codec 101A to perform actions that might be considered a security violation. Example operations that might be considered a security violation are, for example a GET command to retrieve data from the codec 101A or a MOV command to move a block of data from one memory location to another in the codec 101A. In an example embodiment of the invention, the processor 160A examines the serial commands by comparing the received commands with prohibited commands stored in a library, to pass only those commands that are not on a stop list of commands that may be security violation, to the codec 101A.

In another example embodiment of the invention, the received commands are compared with a library of permitted commands and only permitted commands are allowed to pass to the codec.

The room control isolator 200A permits only status information to be returned from the codec 101A to the room controller 210A over one or more one way status links 116A'-116A" to 120A'-120A" established by one or more isolation switches 116A to 120A connected through the processor 160A to the codec 101A. Examples of status information may include simple two state status indicators such as "Command Acknowledged", "Error", "Ready", "Call Up", and "Incoming Call".

The processor 160A coupled between the one way status links 116A'-116A" to 120A'-120A" and the codec 101A receives an acknowledgment message over serial link 101A" of the original serial command, from the control interface of the codec 101A, filters the acknowledgment message to pass only the two state status indicator resulting from the serial command, and signals the teleconferencing room controller 210A over one of the one way status links 116A'-116A" to 120A'-120A" of success or error. In this manner, classified information in the codec 101A cannot be accessed by the room controller 210A.

The isolation switches 116A to 120A use optical fiber, relays or other air gap isolation techniques, to provide a high level of switched, one way isolation between the room controller 210A and the codec 101A. The isolation switches 116A to 120A operate similarly to relays and are controlled by the processor 160A to selectively connect the two state status indicator signals filtered by the processor 160A, to the room controller 210A. This eliminates the ability of the room controller 210A to access any network or conference information from the codec through the isolation switch 115A. In this manner, classified information that may be present in the codec 101A cannot be accessed by the room controller 210A.

The secure room control isolator 200A may transfer room control commands to the codec 101A. The processor 160A and its memory 102 (associated with the storage 106A of FIGS. 1A and 1B) of the room control isolator 200A are coupled between the serial link isolation switch 115A and the codec 101A. The processor 160A includes a CPU 104A and a storage device 106A, to execute program instructions stored in the memory 102, to carry out the functions of the room control isolator 200A. FIGS. 2 and 3 illustrate an example network diagram showing the secure room control isolator 200A receiving acknowledgement messages from the codec 101A. The processor 160A and its memory 102 of the room control isolator 200A are coupled between the one or more isolation switches 116A to 120A and the codec 101A.

In an example embodiment of the invention, the secure room control isolator 200A may include the serial link air gap isolator or isolation switch 115A coupled to the teleconferencing room controller 210A over the one way serial link 115A'-115A" established by the isolation switch 115A to the codec 101A. The secure room control isolator 200A may include at least one air gap isolated status line 116A'-116A" to 120A'-120A" coupled to the teleconferencing room controller. The processor 160A and memory 102 coupled between the serial link air gap isolator 115A and codec 101A, is configured with program instructions, which when executed by the processor, receives serial commands constrained to flow in only one direction by the serial link air gap isolator 115A from the teleconferencing room controller 210A. The processor 160A examines the serial commands by comparing the received commands with prohibited commands stored in a library, to pass only legitimate commands that are not a security violation, to the codec 101A. The buffer, compare function, and library represent program instructions in memory 102 that perform those functions when executed by the CPU 104A. The processor 160A transmits one of the legitimate commands to the control interface of the codec 101A.

The processor 160A receives an acknowledgment message in the control and status receive buffer 171 on line 101A" from the control interface of the codec 101A, in response to the original legitimate command. The processor 160A parses the acknowledgment message in parser 175 and filters the acknowledgment message in filters 177, 179, or 181, depending on which type of acknowledgment message is identified by the parser 175, message 152' for the codec to send a camera image, message 154' for the codec to display the meeting room (near side) and the remote VTC system (far side), and message 156' for the codec to dial a call. Then the switch control 185 passes only a simple two state status indicator of the status of the codec resulting from the original legitimate command.

The switch control 185 receives the status result output of the respective filter 177, 179, or 181 and sends a selection signal on line 187 to the multiplexor 173 to send an enabling signal to a selected one of the isolation switches 116A to 120A, depending on whether the acknowledgment message indicates, for example, success, error, ready, call up, or call ring. An enabling signal for "success" (or "done") is sent on line 116A" to the isolation switch 116A. An enabling signal for "error" is sent on line 117A" to the isolation switch 117A. An enabling signal for "ready" is sent on line 118A" to the isolation switch 118A. An enabling signal for "call up" is sent on line 119A" to the isolation switch 119A. An enabling signal for "call ring" is sent on line 120A" to the isolation switch 120A. The switch control 185 transmits only the simple two state status indicator through the selected one of the isolation switches 116A to 120A, to the teleconferencing room controller 210A, in order to prevent classified information in the codec 101A from being transmitted to the room controller 210A. The buffer 171, parser 175, filters 177, 179, and 181, switch control 185 and multiplexor 173 represent program instructions in memory 102 that perform those functions when executed by the CPU 104A. The resulting embodiments of the invention provide a secure room control isolator that meets the DISA and other standard security requirements and enhances operation, management and control of a video teleconferencing room.

FIG. 2 is an example network diagram showing the details of the air gap isolated status lines controlled by the processor and memory of the secure room control isolator of FIG. 3. The switch control 185 sends an enabling signal to one of the isolation switches 116A to 120A. The switch control 185 receives the status result output of the respective filter 177, 179, or 181 and sends an enabling signal to one of the isolation switches 116A to 120A, depending on whether the acknowledgment message indicates, for example, success, error, ready, call up, or call ring. An enabling signal for "success" (or "done") is sent on line 116A" to the isolation switch 116A. An enabling signal for "error" is sent on line 117A" to the isolation switch 117A. An enabling signal for "ready" is sent on line 118A" to the isolation switch 118A. An enabling signal for "call up" is sent on line 119A" to the isolation switch 119A. An enabling signal for "call ring" is sent on line 120A" to the isolation switch 120A.

Additional description of the secure room control isolator may be found in the co-pending U.S. patent application Ser. No. 12/565,253, entitled "SECURE VIDEO TELECON- FERENCING ROOM CONTROL ISOLATOR," that was filed Sep. 23, 2009, the disclosure of which is incorporated herein by reference.

Example embodiments of the invention include a sequencer 250 that controls the sequence of operations when moving a video teleconferencing terminal 100A between secure networks 120 and 124. The sequencer receives commands to initiate the operation from an initiator, such as a user-initiated button press from a control console 210A or a user-initiated request from an Internet interface, or for a scheduled operation from a scheduling interface 240. The sequencer 250 then issues commands to a secure database of terminal configuration data 242 and a control isolator 200A to both transfer a video teleconferencing terminal 100A to a new secure network 124 to begin a conference and to remove a video teleconferencing terminal 100A from a secure network 124 to end a conference.

Figure 4A:
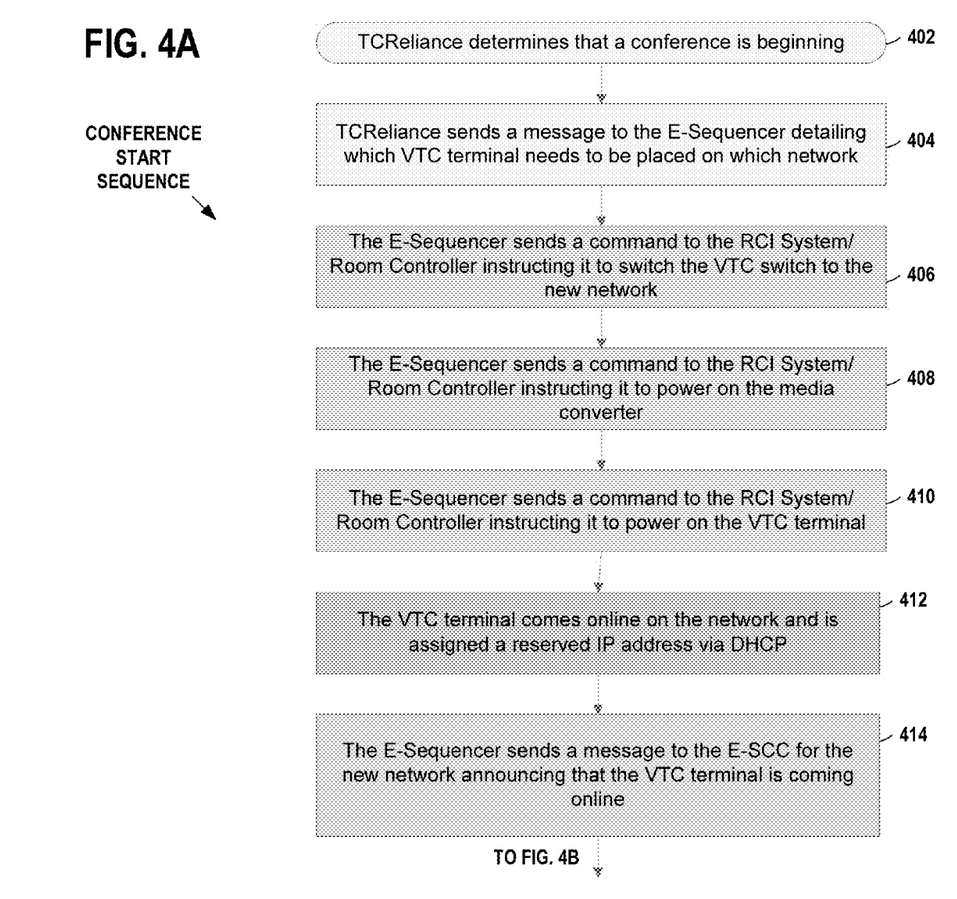
FIGS. 4A and 4B illustrate an example flow diagram showing the conference start sequence for the Multi-Domain Video Network Switch system.
Figure 4B:
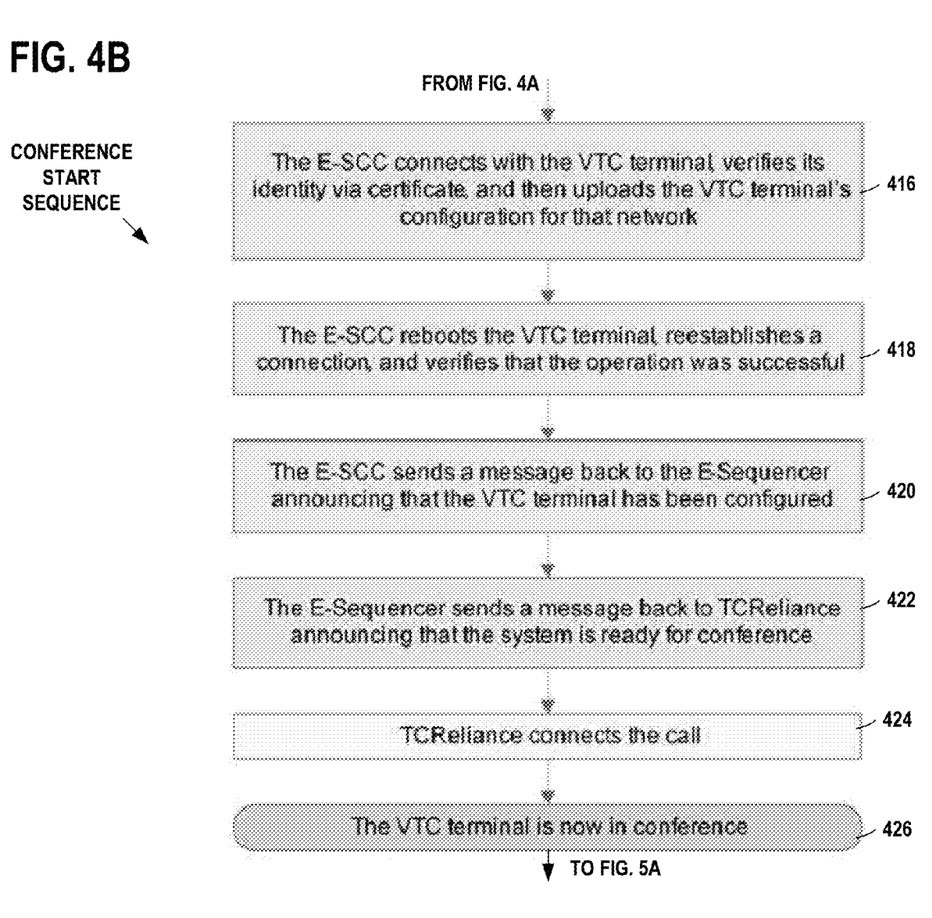

FIGS. 4A and 4B illustrate an example flow diagram showing the conference start sequence.

Step 402: TC Reliance determines that a conference is beginning

Step 404: TC Reliance sends a message to the E-Sequencer detailing which VTC terminal needs to be placed on which network Step 406: The E-Sequencer sends a command to the RCI System/Room Controller instructing it to switch the VTC terminal to the new network. The sequencer sends a command to the control isolator to display a message at or near the video teleconferencing terminal's display device indicating that the classification of the room is being changed.

Figure 5A:
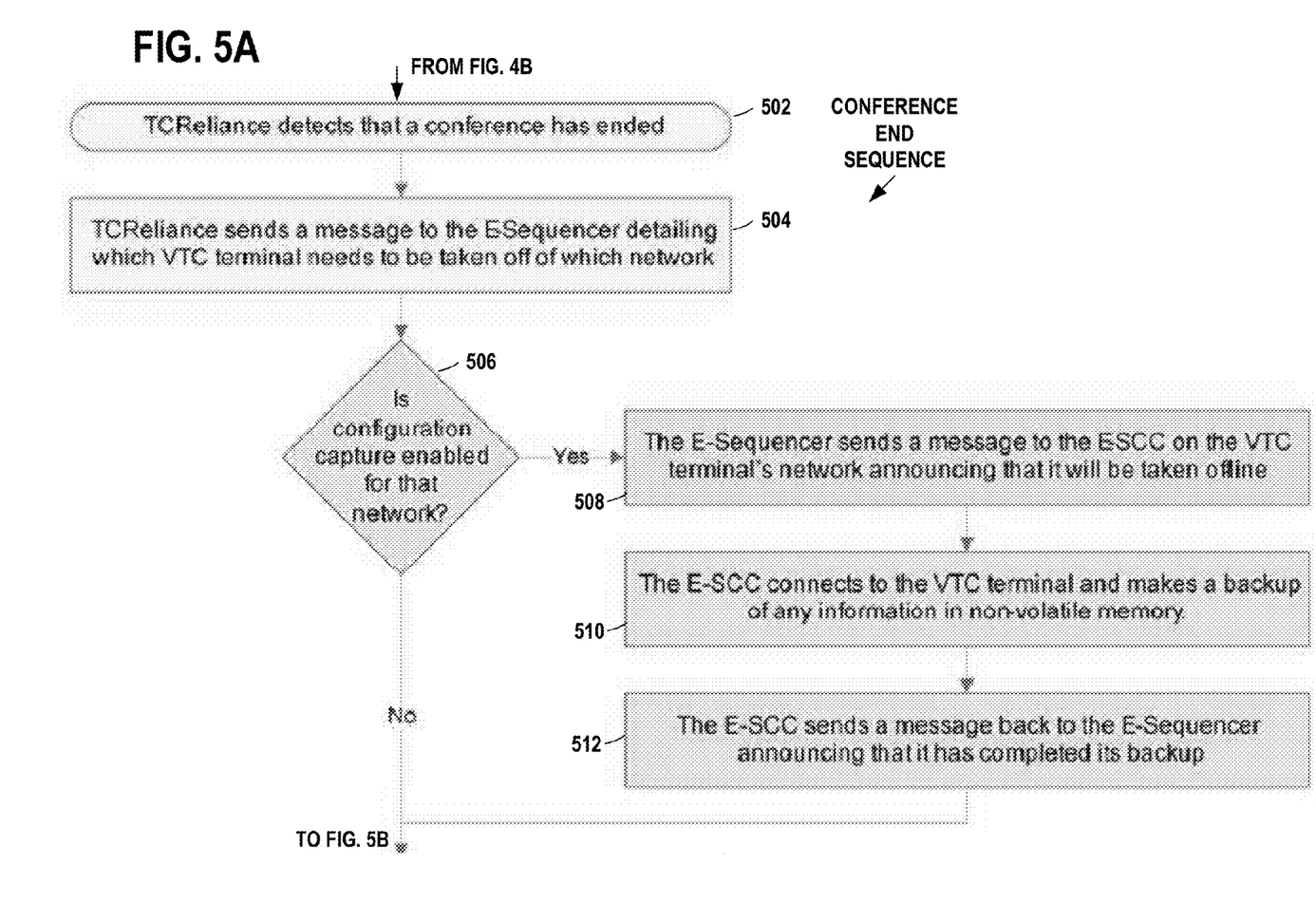
FIGS. 5A and 5B illustrate an example flow diagram showing the conference end sequence for the Multi-Domain Video Network Switch system.
Figure 5B:
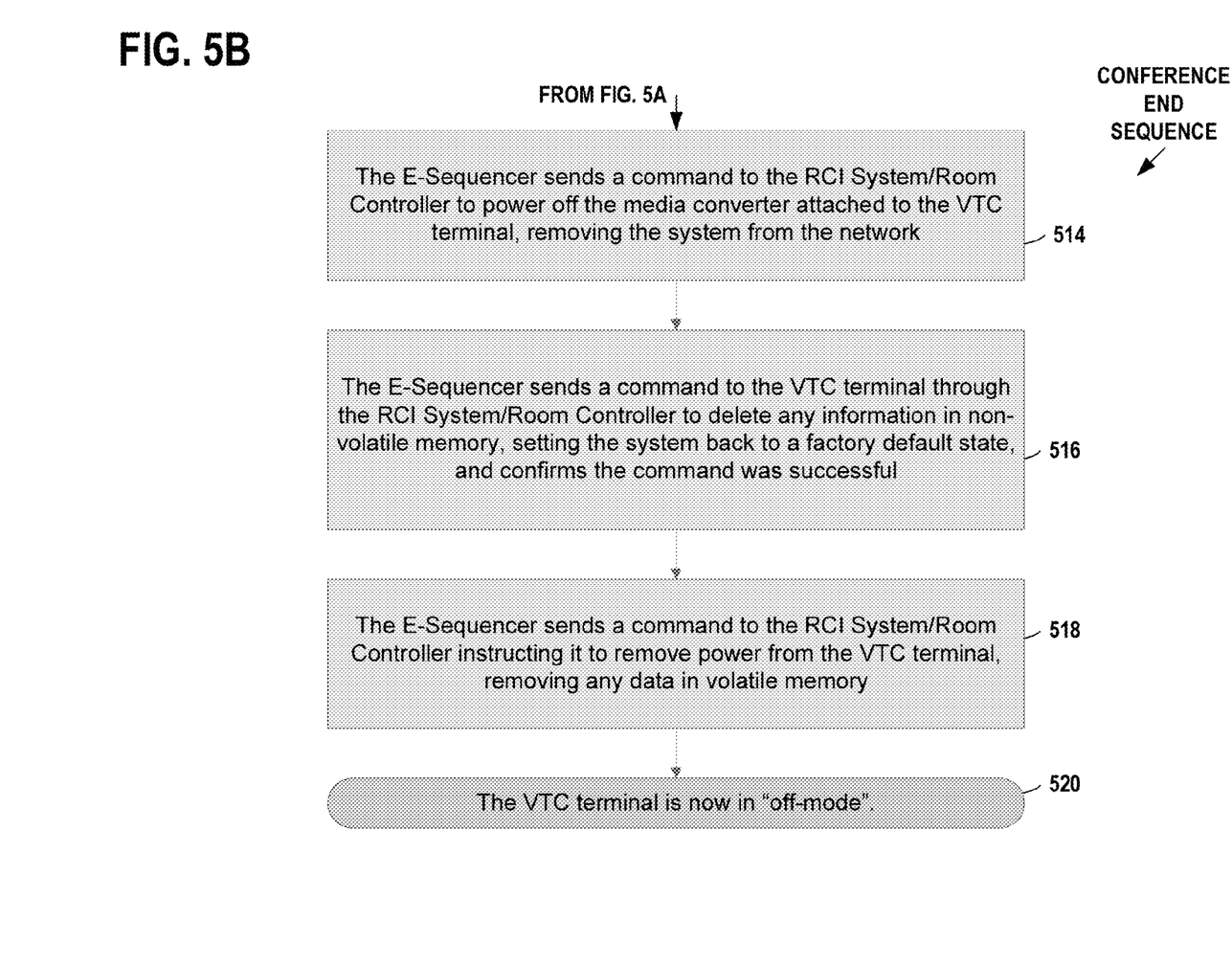

Step 408: The E-Sequencer sends a command to the RCI System/Room Controller instructing it to power on the media converter Step 410: The E-Sequencer sends a command to the RCI System/Room Controller instructing it to power on the VTC terminal Step 412: The VTC terminal comes online on the network and is assigned a reserved IP address via DHCP Step 414: The E•Sequencer sends a message to the E-SCC for the new network announcing that the VTC terminal is coming online Step 416: The E•SCC connects with the VTC terminal verifies its identity via certificate. and then uploads the VTC terminal's configuration for that network Step 418: The E•SCC reboots the VTC terminal reestablishes a connection and verifies that the operation was successful Step 420: The E•SCC sends a message back to the E-Sequencer announcing that the VTC terminal has been configured Step 422: The E•Sequencer sends a message back to TC Reliance announcing that the system is ready for conference Step 424: TC Reliance connects the call Step 426: The VTC terminal is now in conference FIGS. 5A and 5B illustrate an example flow diagram showing the conference end sequence.

Step 502: TC Reliance detects that a conference has ended

Step 504: TC Reliance sends a message to the E-Sequencer detailing which VTC terminal needs to be taken off of which network. The sequencer sends a command to the control isolator to display a message at or near the video teleconferencing terminal's display device indicating that the classification of the room is being changed.

Step 506: Is configuration capture enabled for that network?

Step 508: Yes—The E-Sequencer sends a message to the E-SCC on the VTC terminal's network announcing that it will be taken offline Step 510: The E-SCC connects to the VTC terminal and makes a backup of any information in non-volatile memory Step 512: The E•SCC sends a message back to the E•Sequencer announcing that it has completed its backup Step 514: No—The E•Sequencer sends a command to the RCI System/Room Controller to power off the media converter attached to the VTC terminal removing the system from the network Step 516: The E•Sequencer sends a command to the VTC terminal configuration through the RCI System/Room Controller to delete any information in non-volatile memory, setting the system back to a factory default state, resetting the codec in the VTC terminal back to a factory default state, and verifying that the command was successful.

Step 518: The E•Sequencer sends a command to the RCI System/Room Controller instructing it to remove power from the VTC terminal removing any data in volatile memory Step 520: The VTC terminal is now in "off.mode"

Example embodiments of the invention include a computer program product to begin a conference. The computer program product may comprise computer executable program code for the sequencer 250, recorded on a computer readable non-transitory storage medium or memory 254. Examples of such storage media include RAM, ROM, PROM, magnetic disks, optical disks, semiconductor memory circuit devices and micro-SD memory cards (SD refers to the Secure Digital standard), for storing data and/or computer program code. The computer executable program code, when executed by a computer processor CPU 252, causes performance of the following steps.

The sequencer 250 receives a message from the scheduler 240 identifying a video teleconferencing terminal 100A that needs to be placed on a new secure network 124 to begin a conference.

The sequencer 250 sends a command to the control isolator 202 to signal the secure network switch 132 to switch the video teleconferencing terminal to the new secure network.

The sequencer 250 sends a command to the control isolator to power on the media converter 112A connecting the secure network switch to the video teleconferencing terminal, to enable the video teleconferencing terminal to come online on the new secure network and be assigned a network address.

The sequencer 250 sends a message to the secure database of terminal configuration data 242 for the new secure network, announcing that the video teleconferencing terminal is coming online, to enable verification of the video teleconferencing terminal's identity, enable uploading configuration data to the video teleconferencing terminal for the new network, and enable rebooting of the video teleconferencing terminal.

The sequencer 250 receives a message from the secure database of terminal configuration data, announcing that the video teleconferencing terminal has been configured.

The sequencer 250 sends a message to the scheduler announcing that the video teleconferencing terminal is ready for conference.

In example embodiments of the invention, a switching operation may begin as the result of pressing a button on the front panel of a control console in the room, it may be initiated by a room control system, or through a web interface in the sequencer itself.

In example embodiments of the invention, the sequencer causes a verification that the secure network switch has switched the video teleconferencing terminal to the new secure network.

Example embodiments of the invention include a computer program product to end a conference. The computer program product may comprise computer executable program code for the sequencer 250, recorded on a computer readable non-transitory storage medium or memory 254. Examples of such storage media include RAM, ROM, PROM, magnetic disks, optical disks, semiconductor memory circuit devices and micro-SD memory cards (SD refers to the Secure Digital standard), for storing data and/or computer program code. The computer executable program code, when executed by a computer processor CPU 252, causes performance of the following steps.

The sequencer 250 receives a message from the scheduler 240 identifying a video teleconferencing terminal 100A needs to be removed from a secure network 124 to end a conference.

If terminal configuration capture is enabled for the secure network, then the sequencer 250 sends a message to a secure database of terminal configuration data 242, announcing that the video teleconferencing terminal will be taken offline, to enable making a backup copy of information in non-volatile memory of the video teleconferencing terminal.

The sequencer 250 sends a command to the control isolator 202 to power off the media converter 112A connecting the secure network switch 132 to the video teleconferencing terminal, to enable removing the video teleconferencing terminal from the secure network.

The sequencer 250 sends a command to the video teleconferencing terminal, via the control isolator, to delete any information in non-volatile memory, thereby setting the video teleconferencing terminal back to a factory default state.

The sequencer 250 sends a command to the control isolator, to remove power from the video teleconferencing terminal, thereby removing any data in volatile memory.

In example embodiments of the invention, the sequencer causes a resetting of the codec in the VTC terminal back to a factory default state, and a verification that data cleaning of the codec was successful after the resetting.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable medium.

As indicated above, memory/storage devices include, but are not limited to, disks, optical disks, removable memory devices such as smart cards, semiconductor memories such as RAM, ROM, PROMS, etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

The resulting embodiments of the invention provide a Multi-Domain Video Network Switch system that meets the DISA and other standard security requirements and enhances operation, management and control across multiple networks.

Although example embodiments of the invention have been disclosed, a person skilled in the art will understand that changes can be made to the example embodiments without departing from the spirit and scope of the invention.

What is claimed is:

1. A method, comprising:
   receiving in a sequencer, a message from an initiator identifying a video teleconferencing terminal needs to be removed from a secure network to end a conference;
   if terminal configuration capture is enabled for the secure network, then sending by the sequencer, a message to a secure database of terminal configuration data, announcing that the video teleconferencing terminal will be taken offline, to enable making a backup copy of information in non-volatile memory of the video teleconferencing terminal;
   sending by the sequencer, a command to a control isolator to power off a media converter connecting a secure network switch to the video teleconferencing terminal, to enable removing the video teleconferencing terminal from the secure network;
   sending by the sequencer, a command to the video teleconferencing terminal, via the control isolator, to delete any information in non-volatile memory, thereby setting the video teleconferencing terminal back to a factory default state; and
   sending by the sequencer, a command to the control isolator, to remove power from the video teleconferencing terminal, thereby removing any data in volatile memory.

2. The method of claim 1, further comprising:
   causing resetting a codec in the video teleconferencing terminal back to a factory default state, and verifying that data cleaning of the codec was successful after the resetting.

3. The method of claim 1, further comprising:
   sending by the sequencer, a command to the control isolator to display a message on a display device at or near the video teleconferencing terminal indicating that a classification is being changed.

4. An apparatus comprising:
   at least one processor;
   at least one memory including computer program code;
   the at least one memory and the computer program code configured to, with the at least one processor, cause the apparatus at least to:
   receive in an apparatus, a message from an initiator identifying a video teleconferencing terminal needs to be removed from a secure network to end a conference;
   if terminal configuration capture is enabled for the secure network, then send by the apparatus, a message to a secure database of terminal configuration data, announcing that the video teleconferencing terminal will be taken offline, to enable making a backup copy of information in non-volatile memory of the video teleconferencing terminal;
   send by the apparatus, a command to a control isolator to power off a media converter connecting a secure network switch to the video teleconferencing terminal, to enable removing the video teleconferencing terminal from the secure network;
   send by the apparatus, a command to the video teleconferencing terminal, via the control isolator, to delete any information in non-volatile memory, thereby setting the video teleconferencing terminal back to a factory default state; and send by the apparatus, a command to the control isolator, to remove power from the video teleconferencing terminal, thereby removing any data in volatile memory.

5. The apparatus of claim 4 further comprising:

the at least one memory and the computer program code configured to, with the at least one processor, cause the apparatus at least to:

the at least one memory and the computer program code configured to, with the at least one processor, cause the apparatus at least to:

cause resetting a codec in the video teleconferencing terminal back to a factory default state, and verify that data cleaning of the codec was successful after the resetting.

6. The apparatus of claim 4, further comprising:

the at least one memory and the computer program code configured to, with the at least one processor, cause the apparatus at least to:

send by the sequencer, a command to the control isolator to display a message on a display device at or near the video teleconferencing terminal indicating that a classification is being changed.

7. A computer program product comprising computer executable program code recorded on a computer readable non-transitory storage medium, the computer executable program code, when executed by a computer processor, causing performance of the steps of:

receiving in a sequencer, a message from an initiator identifying a video teleconferencing terminal needs to be removed from a secure network to end a conference;

if terminal configuration capture is enabled for the secure network, then sending by the sequencer, a message to a secure database of terminal configuration data, announcing that the video teleconferencing terminal will be taken offline, to enable making a backup copy of information in non-volatile memory of the video teleconferencing terminal;

sending by the sequencer, a command to a control isolator to power off a media converter connecting a secure network switch to the video teleconferencing terminal, to enable removing the video teleconferencing terminal from the secure network;

sending by the sequencer, a command to the video teleconferencing terminal, via the control isolator, to delete any information in non-volatile memory, thereby setting the video teleconferencing terminal back to a factory default state; and sending by the sequencer, a command to the control isolator, to remove power from the video teleconferencing terminal, thereby removing any data in volatile memory.

8. The computer program product of claim 7, further comprising computer executable program code recorded on a computer readable non-transitory storage medium, the computer executable program code, when executed by a computer processor, causing performance of the step of:

causing resetting a codec in the video teleconferencing terminal back to a factory default state, and verifying that data cleaning of the codec was successful after the resetting.

9. The computer program product of claim 7, further comprising computer executable program code recorded on a computer readable non-transitory storage medium, the computer executable program code, when executed by a computer processor, causing performance of the step of:

sending by the sequencer, a command to the control isolator to display a message on a display device at or near the video teleconferencing terminal indicating that a classification is being changed.

* * * * *